(12) United States Patent
Yang et al.

(10) Patent No.: US 8,270,775 B2
(45) Date of Patent: Sep. 18, 2012

(54) SYSTEM AND METHOD OF DETECTING ABSOLUTE COORDINATES

(75) Inventors: Hong Young Yang, Seoul (KR); Seung Gol Lee, Incheon Metropolitan (KR); Sang Hoon Kim, Bucheon (KR)

(73) Assignee: Finger System, Inc., Bucheon, Kyunggi-do (KR)

( * ) Notice: Subject to any disclaimer, the term of this patent is extended or adjusted under 35 U.S.C. 154(b) by 1407 days.

(21) Appl. No.: 11/792,871

(22) PCT Filed: Dec. 12, 2005

(86) PCT No.: PCT/KR2005/004246
§ 371 (c)(1),
(2), (4) Date: Jun. 12, 2007

(87) PCT Pub. No.: WO2006/065045
PCT Pub. Date: Jun. 22, 2006

(65) Prior Publication Data
US 2008/0123965 A1    May 29, 2008

(30) Foreign Application Priority Data
Dec. 13, 2004    (KR) .................. 10-2004-0104902

(51) Int. Cl.
G06K 9/22 (2006.01)
G06K 11/06 (2006.01)
G06F 3/046 (2006.01)
G06F 3/041 (2006.01)
G06F 3/042 (2006.01)
G06F 3/043 (2006.01)
G06F 3/045 (2006.01)
G08C 21/00 (2006.01)

(52) U.S. Cl. .................. 382/315; 178/18.01; 345/173

(58) Field of Classification Search .................. None
See application file for complete search history.

(56) References Cited

U.S. PATENT DOCUMENTS

| | | | |
|---|---|---|---|
| 4,878,249 A | 10/1989 | Mifune et al. | |
| 5,477,012 A | 12/1995 | Sekendur | |
| 5,661,506 A * | 8/1997 | Lazzouni et al. | 345/179 |
| 5,796,868 A * | 8/1998 | Dutta-Choudhury | 382/199 |
| 5,859,646 A | 1/1999 | Takenaka | |
| D472,240 S | 3/2003 | Seog | |
| 7,894,675 B2 * | 2/2011 | Wiedemann et al. | 382/199 |
| 2003/0112220 A1 | 6/2003 | Yang et al. | |
| 2004/0136083 A1 * | 7/2004 | Wang et al. | 359/642 |
| 2005/0040246 A1 * | 2/2005 | Bock | 235/494 |

FOREIGN PATENT DOCUMENTS

CN    1359587 A    7/2002
(Continued)

*Primary Examiner* — Randolph I Chu
(74) *Attorney, Agent, or Firm* — Hamre, Schumann, Mueller & Larson, P.C.

(57) ABSTRACT

A system and method of recognizing absolute coordinates are provided. The absolute coordinate recognition system includes: a pattern recording medium in which each cell is diagrammatized, and a predetermined microcode is allocated to the pattern formed by each arrangement of the diagrammatized cells; a pattern sensing unit recognizing the microcode by sensing the pattern; and a signal processing unit calculating the position of the pattern sensing unit on the pattern recording medium, from the sensed pattern. By constructing the simpler patterns of the pattern recording medium, the absolute coordinate recognition system and method therefor enable imaging system and image sensor with not-high resolutions to recognize the patterns.

12 Claims, 7 Drawing Sheets

FOREIGN PATENT DOCUMENTS

| | | |
|---|---|---|
| EP | 0 469 864 A2 | 7/1991 |
| JP | 63-082584 | 4/1988 |
| JP | 06-348857 | 12/1994 |
| JP | 09-171565 | 6/1997 |
| JP | 10-124251 | 5/1998 |
| JP | 2000-227835 | 8/2000 |
| JP | 2004-62251 A | 2/2004 |
| JP | 2004-310493 A | 11/2004 |
| KR | 10-1988-4400 | 6/1988 |
| KR | 10-1995-1542 | 1/1995 |
| KR | 10-1998-080305 | 11/1998 |
| KR | 10-1999-0080936 | 11/1999 |
| WO | WO 01/01670 | 1/2001 |
| WO | WO 01/16691 | 3/2001 |
| WO | WO 01/26032 | 4/2001 |
| WO | WO 01/26033 | 4/2001 |
| WO | WO 01/48685 | 7/2001 |
| WO | WO 01/71471 | 9/2001 |
| WO | WO 01/71473 | 9/2001 |
| WO | WO 01/75779 | 10/2001 |
| WO | WO 01/75781 | 10/2001 |
| WO | WO 03/001442 A1 | 1/2003 |

* cited by examiner

[Fig. 1]
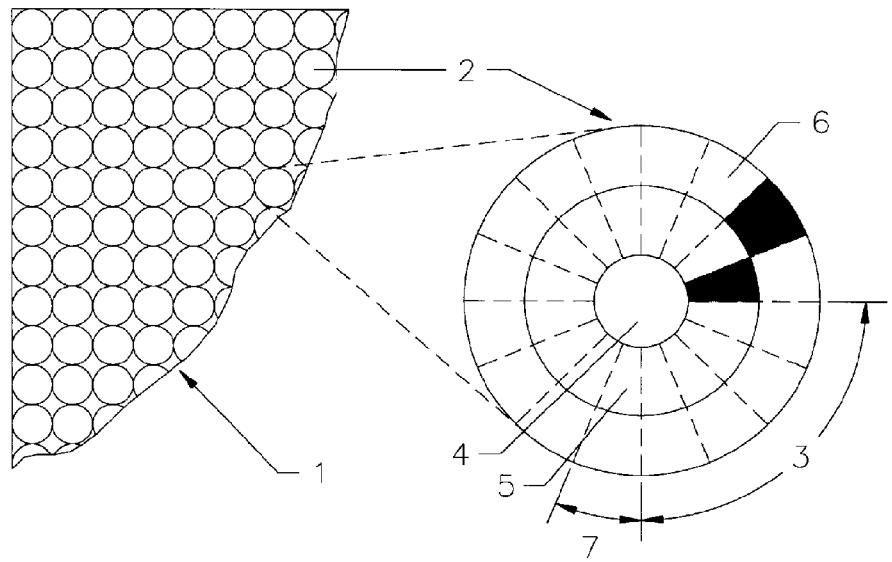
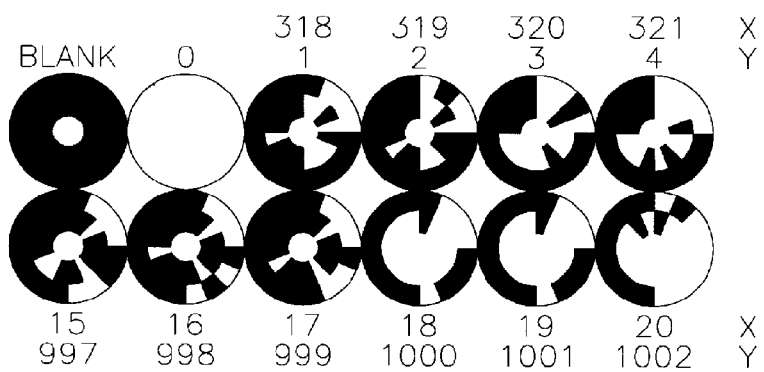
[Fig. 2]
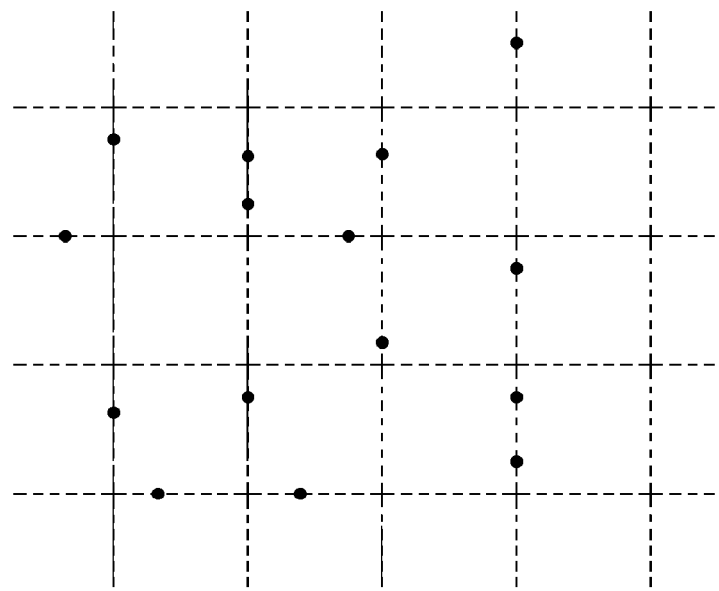

[Fig. 3]
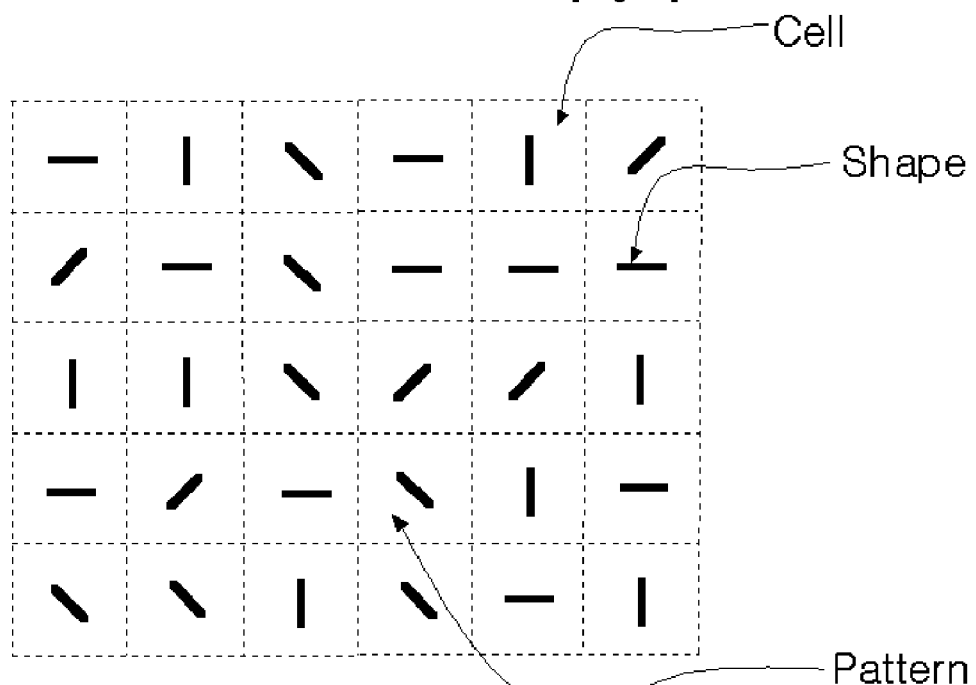
[Fig. 4]
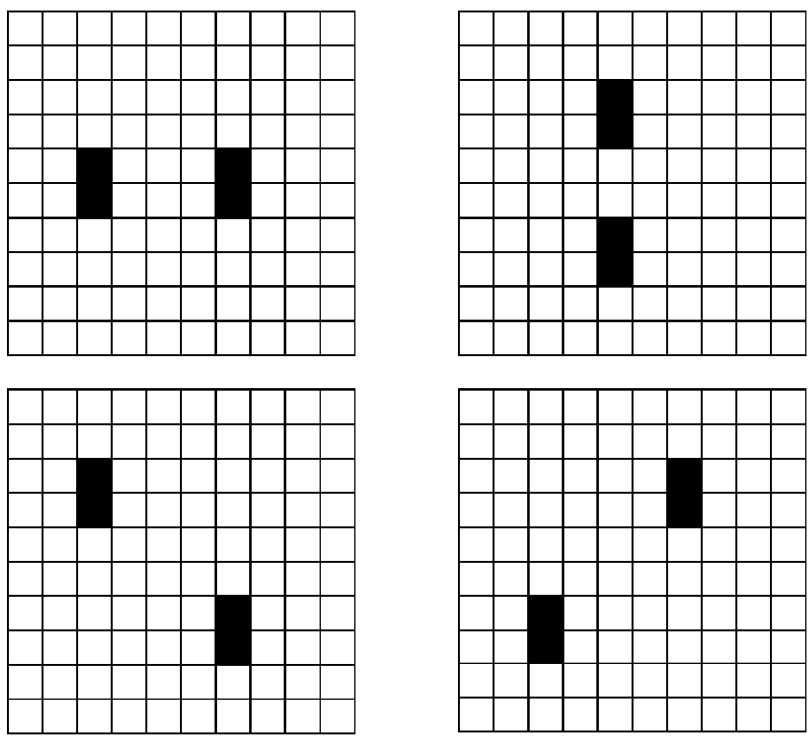

[Fig. 5]
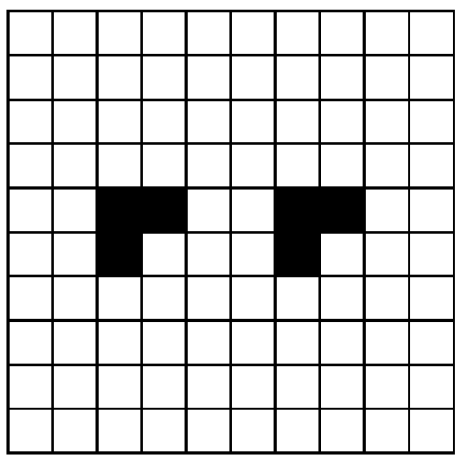
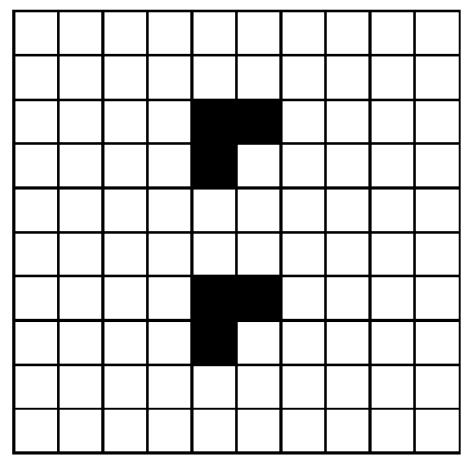
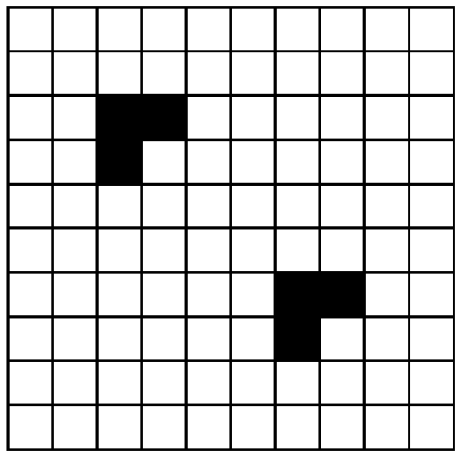
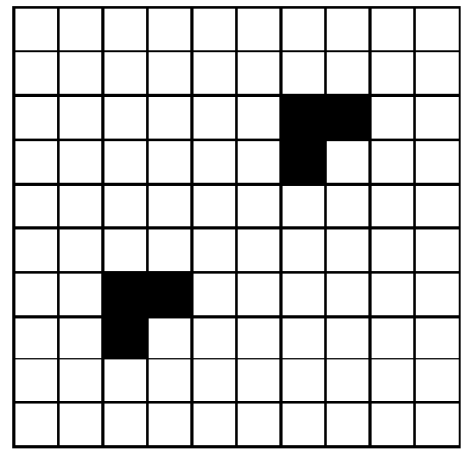

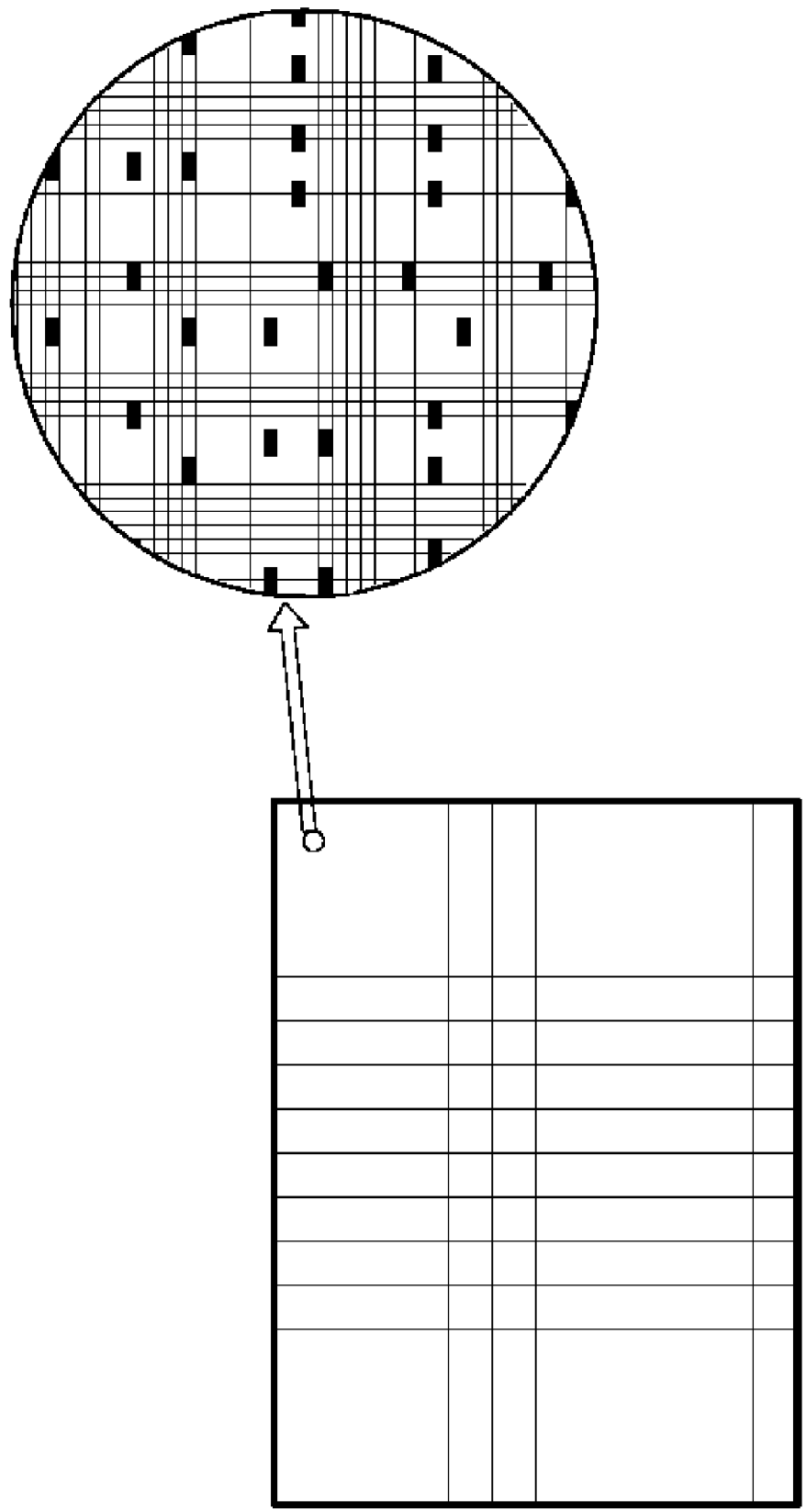
[Fig. 6]

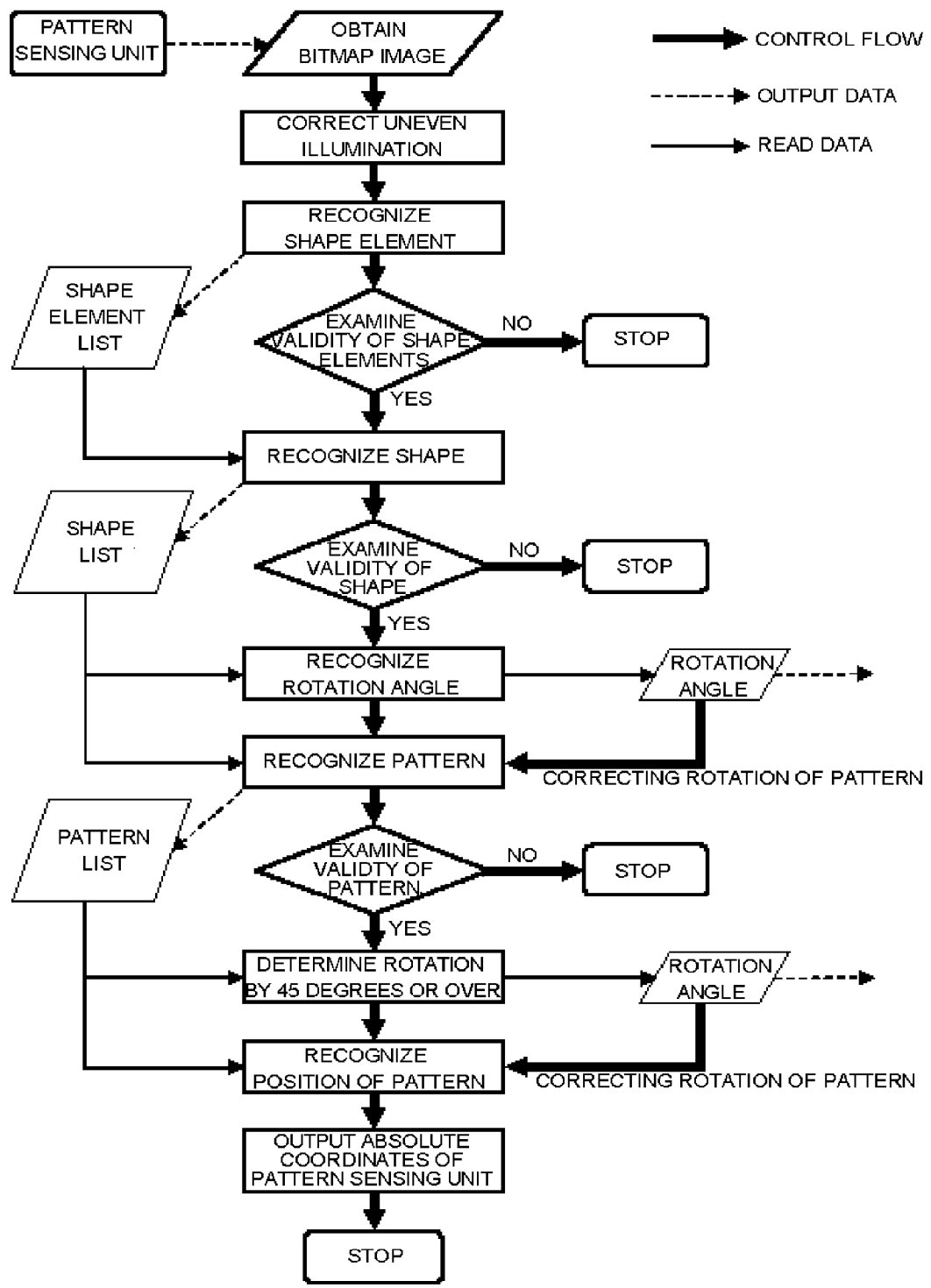
[Fig. 7]

[Fig. 8]
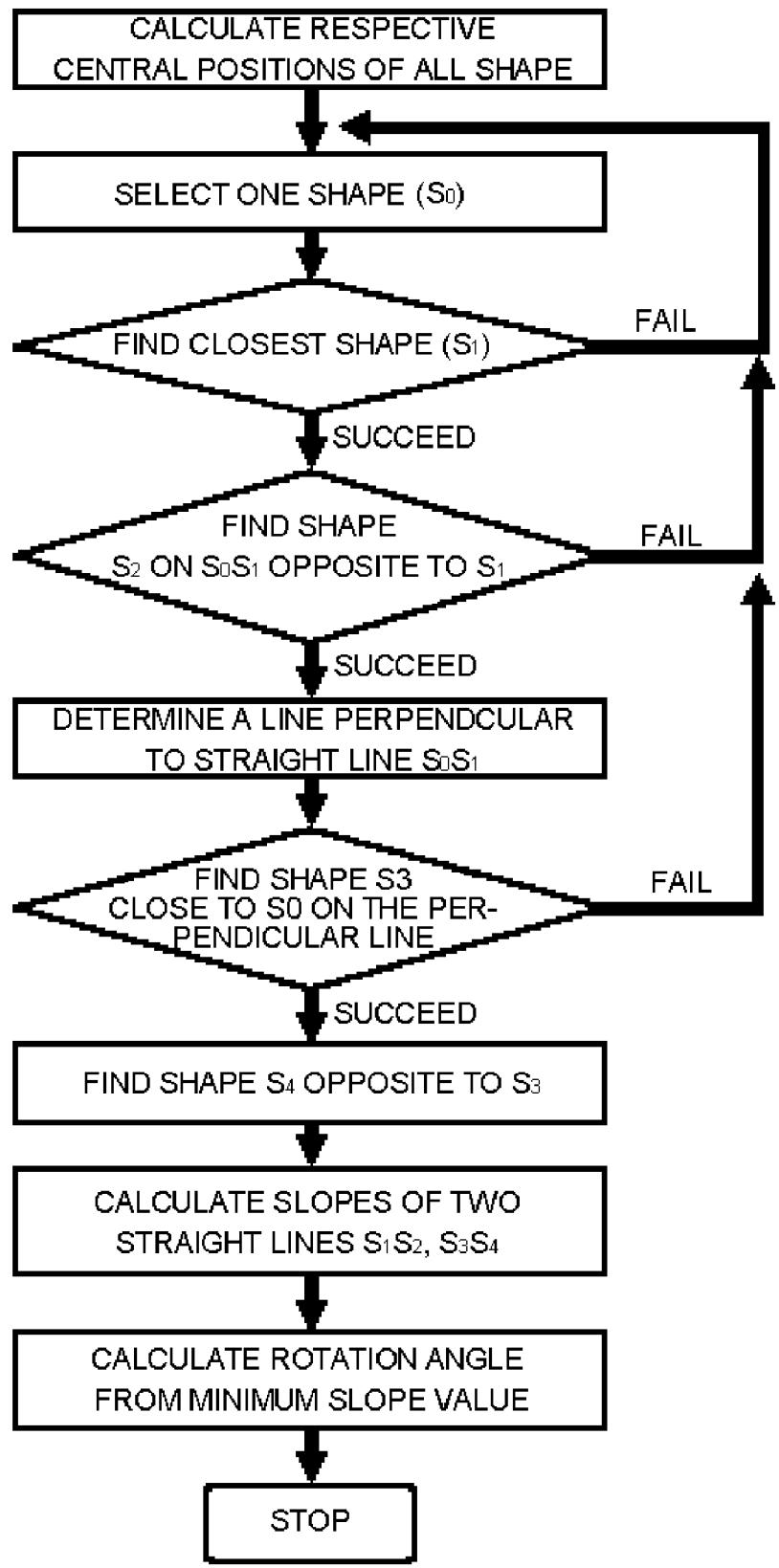

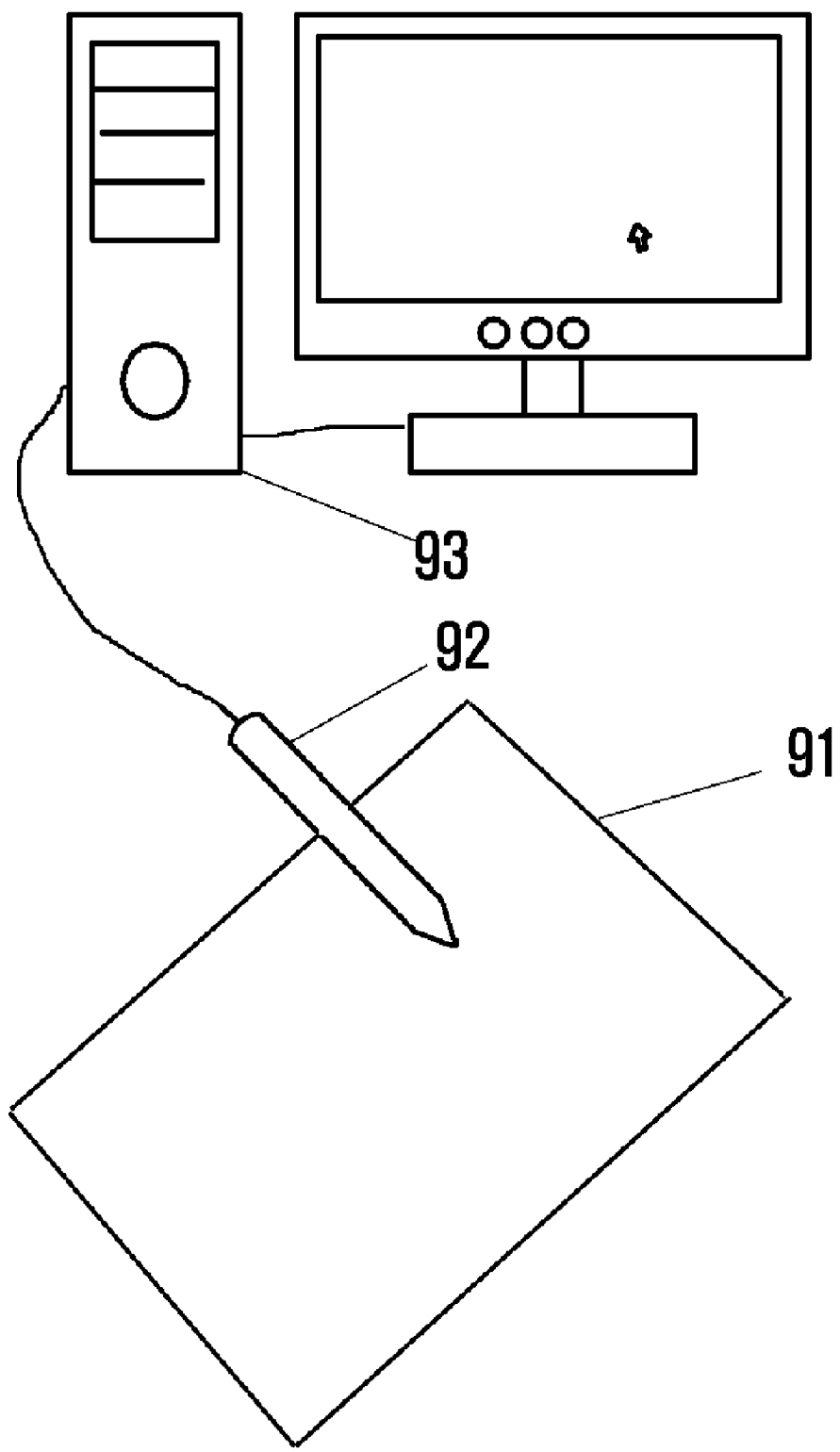
[Fig. 9]

SYSTEM AND METHOD OF DETECTING ABSOLUTE COORDINATES

TECHNICAL FIELD

A system and method of recognizing absolute coordinates are provided. The absolute coordinate recognition system includes a pattern recording medium in which each cell is diagrammatized, and a predetermined microcode is allocated to the pattern formed by each arrangement of the diagrammatized cells; a pattern sensing unit recognizing the microcode by sensing the pattern; and a signal processing unit calculating the position of the pattern sensing unit on the pattern recording medium, from the sensed pattern.

By constructing the simpler patterns on the pattern recording medium, the absolute coordinate recognition system and method therefor enable imaging systems and image sensor with not-high resolutions to recognize the patterns. Accordingly, a position recognition error occurring in the process of sensing a pattern can be minimized. Also, by finely adjusting the slope of a shape with respect to the horizontal direction, the shape in the form of a line recognized by a pattern sensing unit, the number of cases of microcodes occurring with respect to the slope value of even a shape expressed on a virtual line in the form of a simple quadrangle is more diversified. As a result, redundant recognition of a microcode can be prevented. Also, by making the shape density of each cell uniform and by distributing these cells evenly so that the shade of the pattern recording medium can be uniform as a whole, the absolute coordinate recording system and method prevent stains on the pattern recording medium.

BACKGROUND ART

Up to recently, in order to determine the position of an object, such as a writing material, on the surface on which data is recorded or data is not recorded, a variety of methods have been tried. In particular, in relation to a position determination method using an electronic pen, apparatuses for determining a 2-dimensional or a 3-dimensional position in order to input graphic data such as written letters, symbols, and pictures, have been introduced. According to a method of converting position information sensed by a data sensing unit into coordinates, these apparatuses determine an absolute position of a sensing unit on a surface on which data is recorded.

In order to input the written data, a sensing unit, such as a tablet for writing, can be used. Most of 2-dimensional apparatuses are operated by contacts between the writing tablet and the sensing unit.

Generally there are two relations between the sensing unit and the tablet: a passive sensing unit with an active tablet and an active sensing unit with a passive tablet.

In the method of the passive sensing unit with the active tablet, the active tablet is large, heavy, and difficult to carry, and in addition, very expensive. Furthermore, it is difficult to manufacture the active tablet, and due to its complicated electromechanical structure, errors and other incorrect operations may occur easily.

Meanwhile, in the method of the active sensing unit with the passive tablet, the sensing apparatus and a processing apparatus are generally separated, and in addition, coding of the tablet is required such that the use of the tablet is inconvenient. Furthermore, an unexpected error may occur in the process that a signal transmitted by the sensing unit is returning from the tablet to a receiver.

Accordingly, since both the passive sensing unit with the active tablet and the active sensing unit with the passive tablet have the problems described above, careful adjustment of the interface should be performed in order to use the apparatuses as if a user wrote a letter with an ordinary pen. However, the amount of information and accuracy provided by these methods are limited. Also, development of an apparatus capable of processing collectively the information such as the movement, rotation of a sensing unit, the use angle and writing speed of the sensing unit about the tablet has been needed.

To solve these problems, an apparatus enabling easy determination of an absolute position of a sensing unit has been suggested. The apparatus includes a data recording surface on which a coding pattern is provided; a sensor capable of sensing the coding pattern; and a processor capable of determining a current position of the sensor based on a sensed coding pattern. In the operation of this apparatus, if the user writes letters or draws a picture on the data recording surface, the data is displayed on the computer monitor.

There are a variety of methods for coding by using this apparatus, and an example is as the following.

As shown in FIG. 1, according to the method, a symbol is made to be a pattern for coding a position. Each signal is composed of three concentric circles. The outermost circle drawn outermost indicates an X coordinate, and the middle circle indicates a Y coordinate. Each of the outermost circle and the middle circle is divided into 16 parts, each of which indicates a different code according to whether the part is filled or empty. This means that each pair of coordinates is coded by a complicated sign having a predetermined appearance.

As another method, X, Y coordinates can be coded by using check patterns. Here, the method of coding positions is the same as that using the concentric circles.

These known patterns are composed of complicated signs, and the smaller and finer these signs are, the more difficult the implementation of the patterns on a data recording surface becomes. When the resolution of the sensing unit is not high, a fine pattern cannot be recognized accurately and it is highly probable that an error in recognition of a position occurs. Meanwhile, if the signs of the pattern are made to be simple and coarsened, identical microcodes of identical patterns at different positions on the data recording surface may cause duplication. Accordingly, the accuracy for determining an absolute position is lowered and it is difficult for the position sensing unit to sense an accurate position.

Meanwhile, as shown in FIG. 2, there is a coordinate recognition method by a position-coding pattern in which a point is marked on one of 4 positions (left, right, top, and bottom) around each intersection of a plurality of virtual horizontal axes and vertical axes. More specifically, a point is marked on any one of the four places around each intersection of all axes perpendicular to each other and having narrow intervals. Each arrangement with respect to the positions of these points are made to be different to each other and allocated a unique microcode. By sensing these arrangements, a current position of a sensing unit is determined.

However, if patterns are implemented in this method, the number of cases arranging one point around an intersection is limited to 4, and the types of microcodes allocated to the limited number of neighboring points cannot be diversified. That is, due to duplication of identical microcodes an error in recognition of a position can occur. In order to solve this problem, more points should be arranged in a unit area, and the size of each point should be reduced appropriate to the area. This means that when a microcode is allocated to neighboring points, the microcode should be expressed by a more number of points. Accordingly, a pattern recording medium should be printed by a very fine printing or output apparatus, and a sensing unit should have a very high resolution in order to sense each point on the axes having narrow intervals. As a result, in the process of sensing a code, an error in recognition of the position of the sensing unit may still occur.

Meanwhile, instead of obtaining an intersection from horizontal axes and vertical axes perpendicular to each other, virtual lines may be placed to cross each other to make a 120 degree angle, or to make a honeycomb. Then, a point can be disposed around an intersection corresponding to a corner. However, in this case, the number of cases of disposing one point is also limited to 3 or 4, and the problem described above arises.

In addition to disposing points to the left, and right on the horizontal axis, and above and below on the vertical axis of an intersection as in FIG. 2, by further disposing a point to the left below, to the right below, to the left above, and to the right above an intersection, the number of cases of arrangements can be increased. However, in this case the sensing unit should sense a fine change of the position of a point, and therefore the sensing unit, that is, an image system, having a very high resolution is required.

DISCLOSURE OF INVENTION

Technical Problem

To solve the above problems, it is an objective of the present invention to provide a system and method in which a plurality of virtual horizontal axes and virtual vertical axes are set; a pixel that is a minimum area unit surrounded by these virtual lines is formed; a number of neighboring pixels, the number equal to or greater than a pre-determined number, form a cell; each cell is diagrammatized by making the cell include an arbitrary shape expressed by one or more colored pixels; neighboring diagrammatized cells adjacent are combined to form a final pattern; and by doing so, a microcode is allocated independently to the pattern with respect to the arrangement type of the shapes in cells. Accordingly, even when a sensing unit that has an optical sensor having a resolution not higher than that of the conventional sensing unit is used, the sensing result of absolute coordinates can be equal to or higher than that of the conventional sensing unit.

It is another objective of the present invention to provide a system and method by which, by finely adjusting the slope of a shape with respect to the horizontal direction, the shape in the form of a line recognized by a pattern sensing unit, the number of cases of microcodes occurring dependent on the slope value of a shape expressed on even a virtual line in the form of a simple quadrangle is more diversified and as a result, redundant recognition of a microcode can be prevented.

It is another objective of the present invention to provide a system and method by which a shape expressed inside a cell is more simplified and the ratio of black areas for shape areas and white areas for non-shape areas is made to be uniform as a whole on a pattern recording medium. Accordingly, the light and shade of the pattern recording medium is distributed uniformly and stains on the pattern recording medium are hardly felt such that a user can use the pattern recording medium as an ordinary writing paper or printing paper without any inconvenience.

It is another objective of the present invention to provide a pattern recording medium for an absolute coordinate recognition system in which the medium is composed of a plurality of pixels, and 2 or more colored pixels are expressed separated by each predetermined interval so that the pixels are recognized as a virtually connected line or the 2 or more colored pixels are continuously expressed so that the pixels are recognized as an actual line.

It is another objective of the present invention to provide a system and method by which when an original microcode is rotated by a predetermined angle and then recognized, the rotation angle of the microcode is calculated and the result is corrected through comparison with the original microcode so that an error in determination of a position occurring by sensing a rotated state of a microcode can be minimized.

Technical Solution

To achieve the above objectives, the present invention provides a pattern recording medium comprising: a plurality of pixels; and diagrammatized cells each including a shape in which among the pixels, 2 or more colored pixels are separately expressed by each predetermined interval to form the shape such that the shape is recognized as a virtually connected line or the 2 or more colored pixels are continuously expressed to form the shape such that the shape is recognized as an actual line, wherein the diagrammatized cells are arranged to form a pattern and according to the arrangement of the cells, a microcode is allocated.

Also, the present invention provides a method of recognizing absolute coordinates comprising: recognizing two or more colored pixels expressed on the pattern recording medium and distinguished by predetermined intervals, as a shape in the form of a line, or recognizing a shape in the form of a line formed by two or more colored pixels expressed continuously; calculating the position of the pattern sensing unit by using the coordinate value calculated through the recognized shape in the form of a line; and outputting the calculated position to a signal processing unit.

Further, the present invention provides an absolute coordinate recognition system comprising: the pattern recording medium; a pattern sensing unit recognizing the microcode by sensing the pattern; and a signal processing unit calculating the position of the pattern sensing unit on the pattern recording medium, from the sensed pattern.

Advantageous Effects

According to the present invention as described above, even when an imaging system and a sensing unit that have a not high resolution are used, the result of recognition of absolute coordinate can be equal to or higher than that of the conventional method.

Also, according to the present invention, a microcode expressed on the pattern recording medium is simplified and in particular, the ratio of black areas and white areas is made to be constant. By doing so, the shade of the pattern recording medium is made to be uniform as a whole, and stains on the pattern recording medium are hardly felt such that a user can use the pattern recording medium as an ordinary writing paper or printing paper without any inconvenience.

Also, according to the present invention, when an original microcode is rotated by a predetermined angle and then recognized, the rotation angle of the microcode is calculated and the result is corrected through comparison with the original microcode so that an error in determination of a position occurring by sensing a microcode in a rotated state can be minimized.

Also, by finely adjusting the slope of a shape with respect to the horizontal direction, the shape in the form of a line recognized by a pattern sensing unit, the number of cases of microcodes occurring with respect to the slope value of even a shape expressed on a virtual line in the form of a simple quadrangle is more diversified. As a result, redundant recognition of a microcode can be prevented.

Also, the pattern recording medium used in the absolute coordinate recognition system is composed of a plurality of pixels, and the 2 or more colored pixels are continuously expressed so that the pixels are recognized as an actual line, or 2 or more colored pixels are separately expressed by each predetermined interval so that the pixels are recognized as a virtually connected line. Accordingly, the shape does not need to be expressed by continuous shape elements of pixels such that the pattern can be simplified.

BRIEF DESCRIPTION OF THE DRAWINGS

FIG. 1 is a diagram showing an example in relation to a pattern implemented on a conventional pattern recording medium;

FIG. 2 is a diagram showing another example in relation to a pattern implemented on a conventional pattern recording medium;

FIG. 3 is a diagram showing an embodiment of a pattern implemented on a pattern recording medium according to the present invention;

FIG. 4 is a diagram showing diagrammatized cells implemented on a pattern recording medium according to an embodiment of the present invention;

FIG. 5 is a diagram showing diagrammatized cells implemented on a pattern recording medium according to another embodiment of the present invention;

FIG. 6 illustrates a pattern recording medium according to an embodiment of the present invention;

FIG. 7 is a flowchart showing a method of recognizing absolute coordinates according to an embodiment of the present invention;

FIG. 8 is a flowchart showing a method of recognizing the rotation angle of a shape or a pattern according to an embodiment of the present invention; and FIG. 9 illustrates an apparatus for implementing an absolute coordinate recognition system according to an embodiment of the present invention.

BEST MODE FOR CARRYING OUT THE INVENTION

The present invention will now be described more fully with reference to the accompanying drawings, in which exemplary embodiments of the invention are shown.

First, FIG. 3 is a diagram showing an embodiment of a pattern implemented on a pattern recording medium according to the present invention. The pattern recording medium for an absolute coordinate recognition system is composed of a plurality of pixels. Among the pixels, 2 or more colored pixels are separately expressed by each predetermined interval to form a shape such that the shape is recognized as a virtually connected line, or the 2 or more colored pixels are continuously expressed to form a shape such that the shape is recognized as an actual line. Each cell including one of the shapes is diagrammatized by the shape. The diagrammatized cells are arranged to form a pattern, and according to the arrangement of the cells, a microcode is allocated. At this time, the relative position of the center point of the shape included in each cell with respect to the center point of the cell is made to be the same in all cells so that the efficiency of pattern recognition can be enhanced.

Also, the absolute coordinate recognition system may include: a pattern recording medium on which a different microcode is allocated to each pattern; a pattern sensing unit sensing the pattern, recognizing a microcode corresponding to the pattern, and generating an output signal corresponding to the coordinate value; and a signal processing unit processing the output signal to change the signal into coordinate value, and according to the coordinate value, determining the position of the pattern sensing unit on the pattern recording medium.

Also, in an embodiment of the pattern recording medium of the absolute coordinate recognition system, a plurality of virtual horizontal axes and vertical axes are set. A pixel defined as a minimum area surrounded by these virtual lines is formed. A cell is formed by a group of these pixels of a predetermined number. Among these cells, a cell including at least one of a variety of shapes expressed by colored pixels is defined as a diagrammatized cell. Among diagrammatized cells, a plurality of neighboring cells form a predetermined arrangement to finally form one pattern. A microcode is allocated independently to this arrangement of diagrammatized cells of a pattern.

Also, in another embodiment, here the pattern can be made to have a quadrangle shape by a combination of cells arranged in the horizontal direction and vertical direction. At this time, the number of combined cells is set to at least 2 or more, and the pattern is formed by M neighboring cells in the horizontal direction and N neighboring cells in the vertical direction. By doing so, the absolute coordinate value of a position of the center of a pattern sensed with respect to the arrangement type of shapes in cells is provided. Meanwhile, the cell can be made to form a quadrangle shape by combining a plurality of neighboring pixels, and the shape included in the cell can be expressed by a combination of some colored pixels. Also, the shape inside the cell can be diagrammatized as a line or a block.

In particular as shown in FIG. 4, in an embodiment of the present invention, the shape inside a diagrammatized cell can be formed with shape elements, each in the form of a rectangle composed of one colored pixel or neighboring colored pixels in the vertical or horizontal direction. The reason why the shape element can be a rectangle shape is because the plurality of horizontal axes and vertical axes form pixels of a square shape. Two or more shape elements exist in one cell. The shape elements are made to form 4 types of arrangements, including a horizontal arrangement, a vertical arrangement, an arrangement of a slant line with the left end higher than the right end of the line, and an arrangement of a slant line with the left end lower than the right end of the line. A pattern sensing unit is made to recognize the horizontal arrangement as a horizontal line, the vertical arrangement as a vertical line, and the slant arrangements as slant lines so that even with an image system and an image sensor having a low resolution, the pattern can be accurately recognized. Also, when two or more shape elements are disposed in one cell, in addition to the 4 types described above, the more number of cases can be obtained by further dividing the arrangement angles about the horizontal line.

Also, in another embodiment, when one shape is composed of 2 or more shape elements, in order to clarify that the shape elements belong to a predetermined cell, the interval between shape elements belonging to different neighboring cells should be wider than that of the shape elements belonging to an identical cell, and is desirable to be 1.3 or more times wider.

As shown in FIG. 5, the shape elements as described above may be made to have a shape other than a rectangle. However, in order to avoid an error of recognition of a position, it should be noted that the center point of a shape composed of shape elements should always have a constant relative position with respect to the center point of a cell.

The shape in the pattern of the present invention has a characteristic that the shape is much simpler than that expressed on the conventional pattern recording medium. However, if the shape is simpler, the number of cases expressed by the shape can be limited and cells having identical shapes may be printed redundantly on a wide pattern recording medium. In this case, due to the redundant sensing of a pattern, an error in recognition of a position can occur. Methods to avoid this error will now be explained.

If the number of cells forming a pattern is small and at the same time the number of the types of shapes included in each cell is small, the types of different patterns that can be made through a combination of these cells cannot be various. In particular, if the actual size of an individual pattern is very small relative to the entire area of a pattern recording medium, it is possible for identical patterns to be recorded at different positions on one pattern recording medium. That is, identical patterns can be duplicated on one pattern recording medium.

If only a part in which one type of pattern is recorded is observed through an image system or an image sensor, or if only one pattern is recognized in an image containing a variety of patterns at the same time, the pattern duplication problem cannot be solved. However, if an observed image includes two or more types of patterns at the same time and all of these patterns are recognized, the pattern duplication problem described above can be solved. In an aspect of a single pattern, due to the limited types of pattern, it is possible to redundantly record identical patterns on different positions of a pattern recording medium. However, if a plurality of neighboring patterns are observed at the same time and recognized, a case where even the distributions of neighboring patterns are identically arranged does not occur in the pattern recording medium. Accordingly, the pattern duplication problem can be avoided by recognizing two or more neighboring patterns at the same time.

More specifically, compared to recognition of only one pattern, recognition of neighboring different patterns at the same time can reduce the pattern duplication probability by 1/Q. If another neighboring pattern is recognized at the same time, that is, if 3 neighboring patterns are recognized at the same time and even the arrangement is confirmed, the pattern duplication probability is reduced again by 1/Q. If the number of patterns to be recognized is increased in this manner, the duplication probability decreases by 1/Q each time and the pattern duplication problem can be solved ultimately. Here, Q is the number of different patterns determined by the number of cells forming a pattern and the number of types of shape included in a cell. If the number of cells forming a pattern is M×N and the number of types of shape included in a cell is L, the number of types of different patterns that can be formed is M×N×L. Accordingly, if only one pattern is observed or only one pattern at the center of a plurality of observed patterns is recognized, the probability that an identical pattern is duplicated is 1/Q. However, if two patterns are recognized at the same time and an absolute position is determined, the probability that two neighboring patterns are duplicated at the same time is $1/Q^2$. Accordingly, the probability of pattern duplication decreases by 1/Q each time as the number of patterns that are recognized at the same time is increased according to the method described above.

Also, as shown in FIG. 6, in a structure of the pattern recording medium, a diagrammatized cell includes at least two or more shape elements disposed separated to each other. For example, the cell has a square shape formed with a plurality of square pixels, including shape elements expressed by colored pixels. About 100 of these pixels form one diagrammatized cell.

Also, in the pattern as an embodiment, 9 cells diagrammatized as described above form a unit pattern in the form of a square, and the pattern sensing unit is operated so that at least one or more unit patterns can be sensed at the same time.

The pattern recording medium may be a material, such as paper, on which information can be recorded by using a writing tool, and may also be any media that can be patternized even though recording on the medium is impossible.

Next, a method of recognizing absolute coordinates using a pattern recording medium according to an embodiment of the present invention will now be explained. The method of recognizing absolute coordinates include: recognizing two or more colored pixels expressed on the pattern recording medium and distinguished by pre-determined intervals, as a shape in the form of a line, or recognizing a shape in the form of a line formed by two or more colored pixels expressed continuously; calculating the position of the pattern sensing unit by using the coordinate value calculated through the recognized shape in the form of a line; and outputting the calculated position to a signal processing unit.

Here, if a normal pattern formed by each arrangement of the diagrammatized cells is rotated by a predetermined angle and then recognized, the absolute coordinate recognition method may further include: calculating the rotation angle of the rotated pattern relative to the normal pattern; correcting the sensed pattern to the normal pattern by using the calculated rotation angle; and calculating the position of the pattern sensing unit by using the coordinate value calculated from the corrected normal pattern.

Also, the absolute coordinate recognition method may further include: examining whether or not the recording medium sensed by the pattern sensing unit is a pattern recording medium; and if it is determined that the recording medium is not a pattern recording medium, outputting information on this to the pattern sensing unit or a signal processing unit. The absolute coordinate recognition method stated above may further include: recognizing absolute coordinates from a microcode allocated with respect to the arrangement of diagrammatized cells on the recording medium sensed by the pattern sensing unit, and confirming through the number of the diagrammatized cells whether or not the recording medium is a pattern recording medium.

Also, since the background brightness of a sensed image may be uneven spatially according to the illumination condition of the pattern sensing unit, the absolute coordinate recognition method may further include correcting the background brightness evenly before recognizing absolute coordinates from a microcode allocated with respect to the sensed arrangement of diagrammatized cells on the recording medium.

FIG. 7 is a flowchart showing a method of recognizing absolute coordinates according to an embodiment of the present invention. The method includes: sensing an image in units of bitmaps by a pattern sensing unit; recognizing whether or not the brightness by an illumination unit is uneven, and if the brightness is uneven, correcting the brightness; recognizing a shape element expressed by colored pixels; determining whether or not the shape element is a valid shape element; recognizing a shape expressed by the shape elements; determining whether or not the shape is a valid shape; recognizing the rotation angle of the recognized shape about the horizontal direction and correcting the rotation angle; recognizing a pattern expressed by the corrected rotation angle; determining whether or not the recognized pattern is a valid pattern; recognizing whether or not the rotation angle of the shape is 45 degrees or over and correcting the rotation angle; recognizing the position of the pattern by using the corrected rotation angle; and outputting absolute coordinates from the recognized position of the pattern.

Meanwhile, as an embodiment, in the diagrammatized cell, 2 or more shape elements may form 4 types of arrangements, including a horizontal arrangement, a vertical arrangement, an arrangement of a slant line with the left end higher than the right end of the line, and an arrangement of a slant line with the left end lower than the right end of the line. When there are 2 or more shape elements arranged horizontally or vertically among these arrangements, the arrangement may be rotated by a pre-determined angle about the horizontal or vertical line and then sensed by a sensing unit according to a method used by a user. In this case, by calculating the rotation angle from the horizontal or vertical state and correcting the rotation angle, an accurate code should be identified to determine the position of the sensing unit. Accordingly, the operations described above are essential to disclose more clearly the characteristic of the present invention.

A principle for recognizing a rotation angle of a pattern will now be explained and FIG. 8 is a flowchart showing a method of recognizing the rotation angle of a shape or a pattern according to an embodiment of the present invention.

First, from an image observed through a pattern sensing unit composed of an imaging system and an image sensor, the presence of a shape element is found, and the center position of the shape element is determined. Since the resolution of an image may vary with respect to position, the presence of some shape elements may not be recognized. However, in this case, the center positions of all the remaining shape elements excluding the shape elements that are not recognized are determined. Also, the interval between the 2 or more shape elements should be calculated. This can be regarded as an essential operation in the present invention, because if a shape element in a predetermined cell is recognized as a matching pair of another shape element in an adjacent cell, an error may occur in determination of the position of the sensing unit.

Next, a shape is determined by selecting shape elements included in an identical cell among the recognized shape elements, and the center position of the shape is obtained. This selection process is determined by calculating whether or not the interval between shape elements included in the identical cell is $\frac{1}{1.3}$ or less times the interval between the shape element and a shape element included in another cell. One of the determined shapes is selected and the center position of the shape is set as $S_0$. The center position of a shape closest to $S_0$ is found and is set as $S_1$. Here, a straight line $S_0S_1$ connecting the two center positions is obtained. Then, the center position $S_2$ of another shape at the other side opposite to $S_1$ on the same straight line and the closest to $S_0$ is found. Through this process, a formula of the most approximated straight line connecting points $S_1$, $S_0$, and $S_2$ can be obtained. For this, curve fitting of the coordinates of the three points to a linear function can be used.

A line perpendicular to the straight line determined above is found and the center position $S_3$ of a shape closest to $S_0$ on the line is obtained. Again, the center position $S_4$ of a shape closest to $S_0$ and at the other side opposite to $S_3$ is found. A formula of the most approximated straight line connecting the three points $S_3$, $S_0$ and $S_4$ thus determined can be obtained in the same manner as described above.

After thus determining the straight lines perpendicular to each other connecting the center positions of neighboring shapes, a straight line having a smaller angle about the horizontal line of the image and the angle between the straight line and the horizontal line are determined. Then, the angle is the rotation angle of the pattern.

It is clear that in the process, the center position of another shape may be set as $S_0$ and the same process is performed to obtain a rotation angle. By obtaining the mean of the thus obtained rotation angle and the rotation angle obtained in the previous process, a more accurate rotation angle may be determined. This process is the same as a process that a person determines the degree of rotation of a rectangle.

However, the pattern itself does not include information on the top, bottom, left and right sides. According to the method described above, the pattern sensing unit or the pattern recording medium cannot sense a rotation angle equal to or over 45 degrees. However, not by observing only one pattern formed with N×M cells, but by observing two or more neighboring patterns at the same time, the rotation angle can be calculated even when the rotation angle is 45 degrees or over. That is, when two or more patterns are recognized in one image, an identical pattern arrangement cannot be duplicated. Accordingly through the rotation angle of each individual pattern and the arrangement shape of the patterns, the rotation angle equal to or over 45 degrees can be calculated.

Also, a storage medium including a program for operating an absolute coordinate recognition system can be manufactured according to the present invention.

Optimum embodiments have been explained above. However, it is apparent that variations and modifications by those skilled in the art can be effected within the spirit and scope of the present invention defined in the appended claims. Therefore, all variations and modifications equivalent to the appended claims are within the scope of the present invention.

The invention claimed is:

1. An optically sensible pattern recording medium comprising:
   a material which can be patterned with a pattern to include:
   a plurality of pixels; and
   diagrammatized cells each including a shape element in which, among the pixels, 2 colored pixels are separately expressed by a predetermined interval to form the shape element such that the shape element is recognized as a virtual line,
   wherein each of the diagrammatized cells includes a shape element forming four types of arrangements, the 4 types of arrangements including:
   the virtual line having a horizontal arrangement,
   the virtual line having a vertical arrangement,
   the virtual line having an arrangement of a slant line with the left end higher than the right end of the line, and
   the virtual line having an arrangement of a slant line with the left end lower than the right end of the line, and
   the four types of arrangements can be increased according to slopes of the slant line arrangements, and
   wherein the diagrammatized cells are arranged to form the pattern and according to the pattern, a microcode is allocated.

2. The medium of claim 1, wherein each cell has a rectangle shape divided into a plurality of square pixels, and the optically sensible pattern recording medium is formed with a plurality of unit patterns, with the unit pattern having a rectangle shape further divided into at least 2 diagrammatized cells.

3. The medium of claim 1, wherein the material allows information to be recorded by a writing tool.

4. A method of recognizing absolute coordinates as formed on the optically sensible pattern recording medium of claim 1, said method comprising:
recognizing the colored pixels expressed on the pattern recording medium and distinguished by the predetermined interval to form the shape element recognized as the virtual line;
calculating the coordinate position of a pattern sensing unit by using coordinate values calculated for the shape element recognized as the virtual line; and
outputting the coordinate position to a signal processing unit.

5. The method of claim 4, further comprising:
if a normal pattern formed by each arrangement of the diagrammatized cells is rotated by a predetermined angle to form a rotated pattern and then recognized, calculating a rotation angle of the rotated pattern relative to the normal pattern;
correcting the rotated pattern to a corrected normal pattern by using the calculated rotation angle; and
calculating a corrected coordinate position of the pattern sensing unit by using the coordinate values calculated from the corrected normal pattern.

6. The method of claim 5, further comprising:
recognizing whether or not the rotation angle of the shape element is 45 degrees or over;
recognizing the corrected coordinate position of the pattern by using the corrected rotation angle; and
outputting the absolute coordinates from the recognized corrected coordinate position of the pattern.

7. The method of claim 6, wherein in the recognizing of whether or not the rotation angle of the shape is 45 degrees or over, 2 or more patterns are recognized in one image.

8. The method of claim 4, further comprising:
examining whether or not a recording medium sensed by the pattern sensing unit is a pattern recording medium thereby obtaining such information; and
if it is determined that the recording medium is not a pattern recording medium, outputting the information to the pattern sensing unit or the signal processing unit.

9. The method of claim 4, further comprising:
recognizing coordinates from the microcode allocated with respect to the arrangement of diagrammatized cells on the recording medium sensed by the pattern sensing unit, and confirming through the number of the diagrammatized cells whether or not the recording medium is the pattern recording medium.

10. The method of claim 4, wherein the pattern sensing unit further includes an illumination unit, and the method further comprises:
correcting brightness of an area on the pattern recording medium illuminated by the illumination unit, to be uniform.

11. A storage medium of an absolute coordinate recognition system including a program for executing the method of claim 4.

12. An absolute coordinate recognition system comprising:
the optically sensible pattern recording medium of claim 1;
a pattern sensing unit recognizing the microcode by sensing the pattern; and
a signal processing unit calculating the position of the pattern sensing unit on the optically sensible pattern recording medium, from the sensed pattern.

* * * * *